US012681229B2

(12) United States Patent
Kowalski et al.

(10) Patent No.: US 12,681,229 B2
(45) Date of Patent: Jul. 14, 2026

(54) METHODS TO INCREASE EFFICIENCY AND REDUCE SEE THROUGH ARTIFACTS OF REFLECTIVE WAVEGUIDES

(71) Applicant: GOOGLE LLC, Mountain View, CA (US)

(72) Inventors: Jamie Elizabeth Kowalski, Oakland, CA (US); Shreyas Potnis, Kitchener (CA); Rhys Anderson, Kitchener (CA); Kirill Afanasev, Waterloo (CA); Eliezer Glik, San Diego, CA (US); Timothy Paul Bodiya, Shanghai (CN); Victor Isbrucker, Fenelon Falls (CA)

(73) Assignee: GOOGLE LLC, Mountain View, CA (US)

( * ) Notice: Subject to any disclaimer, the term of this patent is extended or adjusted under 35 U.S.C. 154(b) by 718 days.

(21) Appl. No.: 17/963,816

(22) Filed: Oct. 11, 2022

(65) Prior Publication Data

US 2024/0118478 A1      Apr. 11, 2024

(51) Int. Cl.
*F21V 8/00* (2006.01)
*G02B 27/01* (2006.01)

(52) U.S. Cl.
CPC ....... *G02B 6/0055* (2013.01); *G02B 27/0172* (2013.01); *G02B 2027/0123* (2013.01); *G02B 2027/0174* (2013.01); *G02B 2027/0178* (2013.01)

(58) Field of Classification Search
CPC .............. G02B 6/0055; G02B 27/0172; G02B 2027/0123; G02B 2027/0174; G02B 2027/0178; G02B 27/0081
See application file for complete search history.

(56) References Cited

U.S. PATENT DOCUMENTS

| | | | |
|---|---|---|---|
| 2009/0148208 A1 | 6/2009 | Gauvin et al. | |
| 2010/0202734 A1 | 8/2010 | DeCorby | |
| 2014/0234587 A1 | 8/2014 | Maneira | |
| 2016/0041384 A1* | 2/2016 | Robbins .................. | G06F 3/013 |
| | | | 359/630 |
| 2018/0292654 A1* | 10/2018 | Wall ....................... | H04N 9/315 |
| 2020/0307044 A1 | 10/2020 | Kim | |
| 2022/0066204 A1* | 3/2022 | Pfeiffer .............. | G02B 27/0081 |
| 2024/0219737 A1* | 7/2024 | Machida .................. | H04N 5/64 |

FOREIGN PATENT DOCUMENTS

WO      2015018048 A1      2/2015

* cited by examiner

*Primary Examiner* — Collin X Beatty

(57) ABSTRACT

A waveguide including first and second sections has a first molded optic material forming a portion of the geometry of one or more Bragg gratings disposed on one surface of the first section of the waveguide. Similarly, a second molded optic material forming another portion of the geometry of one or more Bragg gratings is disposed on one surface of the second section of the waveguide. Further, a photopolymer material is deposited on the first molded optic material. As the first and second sections are coupled, a waveguide is formed with a layer of photopolymer material disposed in the waveguide with the layer of photopolymer material having a geometry defined by the first and second molded optic materials. Bragg grating holograms are then recorded in the layer of photopolymer material, resulting in a waveguide with a plurality of Bragg gratings.

20 Claims, 10 Drawing Sheets

500

METHODS TO INCREASE EFFICIENCY AND REDUCE SEE THROUGH ARTIFACTS OF REFLECTIVE WAVEGUIDES

BACKGROUND

Within wearable heads-up displays (WHUDs), light emitted from optical engines is provided to the eyes of a user to confer an image to the user. To achieve this aim, some WHUDs implement one or more waveguides to direct and transform the light from the optical engine to the eyes of the user. For example, such WHUDs use waveguides that include exit pupil expanders that increase the number of exit pupils of the light from the optical engine before it is provided to the eyes of the user and outcouplers that provide the light to the eyes of the user. Each exit pupil expander and outcoupler includes gratings that are configured to reflect or diffract light as it travels through the exit pupil expander or outcoupler. However, based on the efficiency of the gratings, some light remains in the exit pupil expanders and outcouplers, interacts with light from outside sources through undesired reflections or diffraction, or both as the exit pupil expander or outcoupler provides light to another part of the WHUD. Such remaining light, light interacting with outside sources, or both causes portions of the exit pupil expanders and outcouplers to be visible, creating see-through artifacts in the WHUD. Such see-through artifacts negatively impact user experience by obstructing a user's view, distracting users, distracting onlookers, or any combination thereof.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
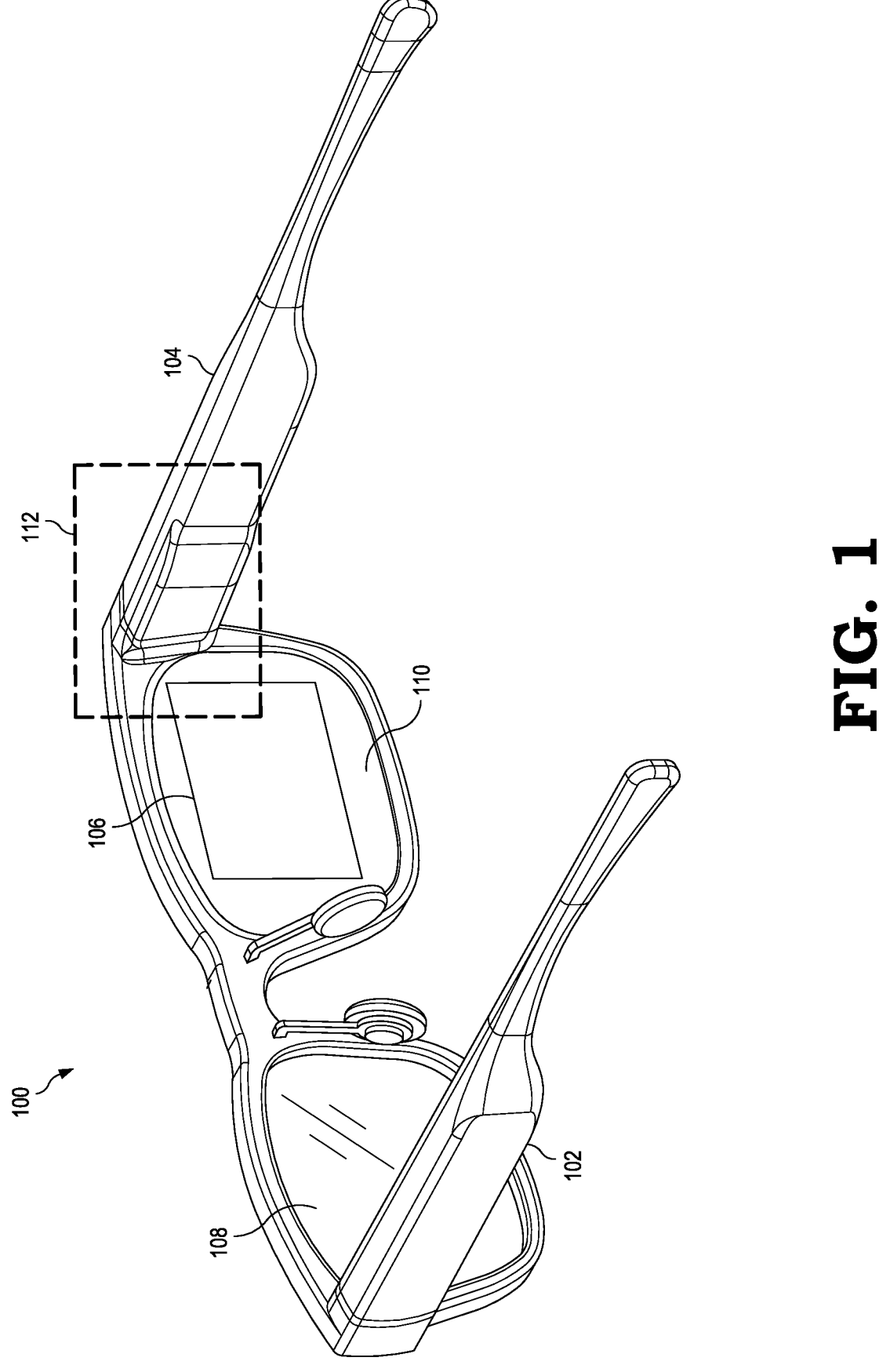
FIG. 1 shows an example display system housing a laser projector system configured to project images toward the eye of a user, in accordance with some embodiments.

Some WHUDs are designed to look like eyeglasses, with at least one of the lenses containing a waveguide to direct light to a user's eye. The combination of the lens and waveguide is referred to as an "optical combiner". Such waveguides form, for example, exit pupil expanders (EPEs) and outcouplers that form and guide light to the user's eye. The WHUD generally has a frame designed to be worn in front of a user's eyes to allow the user to view both their environment and computer-generated content projected from the combiner. Components which are necessary to the functioning of a typical WHUD, such as, for example, a light engine to project computer-generated content, cameras to pinpoint physical location, cameras to track the movement of the user's eye(s), processors to power the light engine, and a power supply, are typically housed within the frame of the WHUD. As a WHUD frame has limited volume in which to accommodate these components, it is desirable that these components be as small as possible and configured to interact with the other components in very small volumes of space.

However, only a portion of the light received at the EPEs and outcouplers of the waveguide is directed to another portion of the optical combiner. For example, based on the efficiencies of an EPE or outcoupler, a portion of received light remains in the EPE or outcoupler as the EPE or outcoupler directs the received light to another portion of the optical combiner. As another example, based on the efficiencies of an EPE or outcoupler, a portion of the received light interacts with light from outside sources through undesired reflections or diffraction as the EPE or outcoupler directs the received light to another portion of the optical combiner. The efficiency of an EPE or outcoupler represents, for example, a relationship between the amount of received light guided to a second point in the optical combiner and the amount of remaining light in the EPE or outcoupler, respectively. Such remaining light in the EPE or outcoupler, light interacting with outside sources in the EPE or outcoupler, or both cause one or more portions of the EPE or outcoupler, respectively, to be illuminated, resulting in one or more see-through artifacts that are visible to the user, those around the user, or both. These see-through artifacts negatively impact user experience by obstructing a user's view, distracting users, or distracting onlookers. To this end, FIGS. 1-12 illustrate systems and methods for reducing the number of see-through artifacts in exit pupil expanders, outcouplers, or both. Specifically, FIGS. 1-12 illustrate systems and methods for a waveguide used to form one or more EPEs, outcouplers, or both, that includes one or more Bragg gratings to direct light through the waveguide. Such Bragg gratings are effectively dispersion-free (that is, effectively do not separate polychromatic light into light of constituent wavelengths), helping to increase the efficiency of the EPEs and outcouplers and to reduce the number of see-through artifacts in the EPEs and outcouplers.

To achieve such a waveguide with one or more Bragg gratings, two pieces of substrate each having opposing surfaces (e.g., top and bottom surfaces) are used. A first molded optic material forming at least a portion of the geometry of one or more Bragg gratings is disposed on one surface (e.g., a top surface) of the first piece of substrate. Similarly, a second molded optic material forming at least another portion of the geometry of one or more Bragg gratings is disposed on one surface (e.g., a bottom surface) of the second piece of substrate. The first and second model optic materials are formed such that they couple together and are effectively flush when coupled to form the waveguide. Further, a photopolymer material is deposited on the first molded optic material before the first molded optic material is coupled with the second molded optic material.

As such, when the first molded optic material is coupled to the second molded optic material, a waveguide is formed with a layer of photopolymer material disposed in the waveguide with the layer of photopolymer material having a geometry defined by the first and second molded optic materials. Using such a waveguide, Bragg grating holograms are then recorded in the layer of photopolymer material, resulting in a waveguide with a plurality of Bragg gratings.

FIG. 1 illustrates an example display system 100 having a support structure 102 that includes an arm 104, which houses a laser projection system configured to project images toward the eye of a user, such that the user perceives the projected images as being displayed in a field of view (FOV) area 106 of a display at one or both of lens elements 108, 110. In the depicted embodiment, the display system 100 is a wearable heads-up display (WHUD) that includes a support structure 102 configured to be worn on the head of a user and has a general shape and appearance of an eyeglasses (e.g., sunglasses) frame. The support structure 102 contains or otherwise includes various components to facilitate the projection of such images toward the eye of the user, such as a laser projector, an optical scanner, and a waveguide. In some embodiments, the support structure 102 further includes various sensors, such as one or more front-facing cameras, rear-facing cameras, other light sensors, motion sensors, accelerometers, and the like. The support structure 102 further can include one or more radio frequency (RF) interfaces or other wireless interfaces, such as a Bluetooth™ interface, a WiFi interface, and the like. Further, in some embodiments, the support structure 102 further includes one or more batteries or other portable power sources for supplying power to the electrical components of the display system 100. In some embodiments, some or all of these components of the display system 100 are fully or partially contained within an inner volume of support structure 102, such as within the arm 104 in region 112 of the support structure 102. It should be noted that while an example form factor is depicted, it will be appreciated that in other embodiments the display system 100 may have a different shape and appearance from the eyeglasses frame depicted in FIG. 1.

One or both of the lens elements 108, 110 are used by the display system 100 to provide an augmented reality (AR) display in which rendered graphical content can be superimposed over or otherwise provided in conjunction with a real-world view as perceived by the user through the lens elements 108, 110. For example, laser light used to form a perceptible image or series of images may be projected by a laser projector of the display system 100 onto the eye of the user via a series of optical elements, such as a waveguide formed at least partially in the corresponding lens element, one or more scan mirrors, and one or more optical relays. One or both of the lens elements 108, 110 thus include at least a portion of a waveguide that routes display light received by an incoupler of the waveguide to an outcoupler of the waveguide, which outputs the display light toward an eye of a user of the display system 100. The display light is modulated and scanned onto the eye of the user such that the user perceives the display light as an image. In addition, each of the lens elements 108, 110 is sufficiently transparent to allow a user to see through the lens elements to provide a field of view of the user's real-world environment such that the image appears superimposed over at least a portion of the real-world environment.

In some embodiments, the projector is a digital light processing-based projector, a scanning laser projector, or any combination of a modulative light source such as a laser or one or more LEDs and a dynamic reflector mechanism such as one or more dynamic scanners or digital light processors. In some embodiments, the projector includes multiple laser diodes (e.g., a red laser diode, a green laser diode, and/or a blue laser diode) and at least one scan mirror (e.g., two one-dimensional scan mirrors, which may be micro-electromechanical system (MEMS)-based or piezo-based). The projector is communicatively coupled to the controller and a non-transitory processor-readable storage medium or memory storing processor-executable instructions and other data that, when executed by the controller, cause the controller to control the operation of the projector. In some embodiments, the controller controls a scan area size and scan area location for the projector and is communicatively coupled to a processor (not shown) that generates content to be displayed at the display system 100. The projector scans light over a variable area, designated the FOV area 106, of the display system 100. The scan area size corresponds to the size of the FOV area 106 and the scan area location corresponds to a region of one of the lens elements 108, 110 at which the FOV area 106 is visible to the user. Generally, it is desirable for a display to have a wide FOV to accommodate the outcoupling of light across a wide range of angles. Herein, the range of different user eye positions that will be able to see the display is referred to as the eyebox of the display.

In some embodiments, the projector routes light via first and second scan mirrors, an optical relay disposed between the first and second scan mirrors, and a waveguide disposed at the output of the second scan mirror. In some embodiments, at least a portion of an outcoupler of the waveguide may overlap the FOV area 106. These aspects are described in greater detail below.

Figure 2:
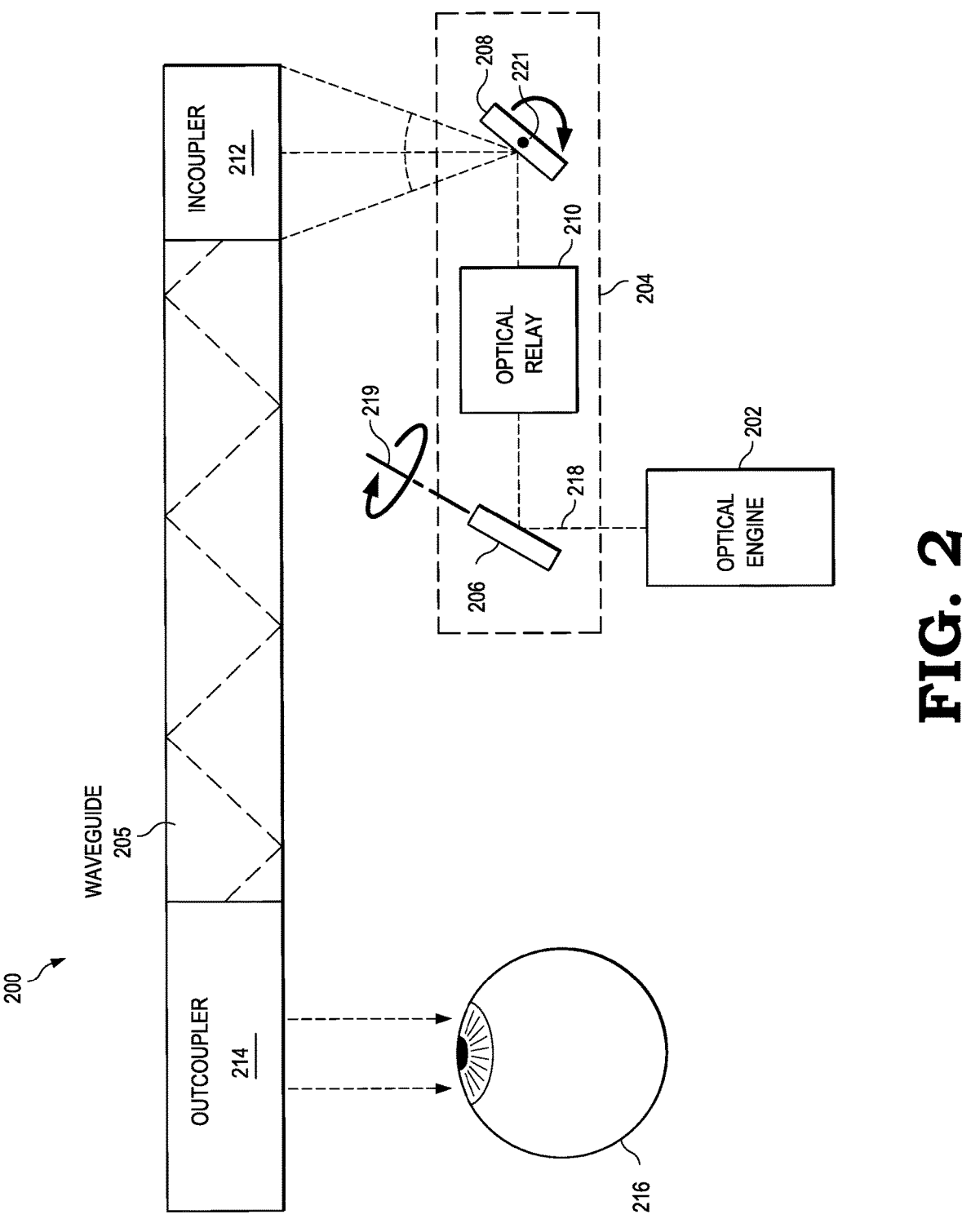
FIG. 2 is a diagram illustrating a laser projection system having an optical scanner that includes an optical relay disposed between two scan mirrors, in accordance with some embodiments.

FIG. 2 illustrates a simplified block diagram of a laser projection system 200 that projects images directly onto the eye of a user via laser light. The laser projection system 200 includes an optical engine 202, an optical scanner 204, and a waveguide 205. The optical scanner 204 includes a first scan mirror 206, a second scan mirror 208, and an optical relay 210. The waveguide 205 includes an incoupler 212 and an outcoupler 214, with the outcoupler 214 being optically aligned with an eye 216 of a user in the present example. In some embodiments, the laser projection system 200 is implemented in a wearable heads-up display or other display system, such as the display system 100 of FIG. 1.

The optical engine 202 includes one or more laser light sources configured to generate and output laser light 218 (e.g., visible laser light such as red, blue, and green laser light and/or non-visible laser light such as infrared laser light). In some embodiments, the optical engine 202 is coupled to a driver or other controller (not shown), which controls the timing of emission of laser light from the laser light sources of the optical engine 202 in accordance with instructions received by the controller or driver from a computer processor coupled thereto to modulate the laser light 218 to be perceived as images when output to the retina of an eye 216 of a user.

For example, during the operation of the laser projection system 200, multiple laser light beams having respectively different wavelengths are output by the laser light sources of the optical engine 202, then combined via a beam combiner (not shown), before being directed to the eye 216 of the user. The optical engine 202 modulates the respective intensities of the laser light beams so that the combined laser light reflects a series of pixels of an image, with the particular intensity of each laser light beam at any given point in time contributing to the amount of corresponding color content and brightness in the pixel being represented by the combined laser light at that time.

One or both of the scan mirrors 206 and 208 of the optical scanner 204 are MEMS mirrors in some embodiments. For example, the scan mirror 206 and the scan mirror 208 are MEMS mirrors that are driven by respective actuation voltages to oscillate during active operation of the laser projection system 200, causing the scan mirrors 206 and 208 to scan the laser light 218. Oscillation of the scan mirror 206 causes laser light 218 output by the optical engine 202 to be scanned through the optical relay 210 and across a surface of the second scan mirror 208. The second scan mirror 208 scans the laser light 218 received from the scan mirror 206 toward an incoupler 212 of the waveguide 205. In some embodiments, the scan mirror 206 oscillates along a first scanning axis 219, such that the laser light 218 is scanned in only one dimension (i.e., in a line) across the surface of the second scan mirror 208. In some embodiments, the scan mirror 208 oscillates or otherwise rotates along a second scanning axis 221. In some embodiments, the first scanning axis 219 is perpendicular to the second scanning axis 221.

In some embodiments, the incoupler 212 has a substantially rectangular profile and is configured to receive the laser light 218 and direct the laser light 218 into the waveguide 205. The incoupler 212 is defined by a smaller dimension (i.e., width) and a larger orthogonal dimension (i.e., length). In an embodiment, the optical relay 210 is a line-scan optical relay that receives the laser light 218 scanned in a first dimension by the first scan mirror 206 (e.g., the first dimension corresponding to the small dimension of the incoupler 212), routes the laser light 218 to the second scan mirror 208, and introduces a convergence to the laser light 218 in the first dimension to an exit pupil beyond the second scan mirror 208. An exit pupil in an optical system, for example, refers to the location along the optical path where beams of light intersect. For example, the possible optical paths of the laser light 218, following reflection by the first scan mirror 206, are initially spread along the first scanning axis, but later these paths intersect at an exit pupil beyond the second scan mirror 208 due to convergence introduced by the optical relay 210. For example, the width (i.e., smallest dimension) of a given exit pupil approximately corresponds to the diameter of the laser light corresponding to that exit pupil. Accordingly, the exit pupil can be considered a "virtual aperture". According to various embodiments, the optical relay 210 includes one or more collimation lenses that shape and focus the laser light 218 on the second scan mirror 208 or includes a molded reflective relay that includes two or more spherical, aspheric, parabolic, and/or freeform lenses that shape and direct the laser light 218 onto the second scan mirror 208. The second scan mirror 208 receives the laser light 218 and scans the laser light 218 in a second dimension, the second dimension corresponding to the long dimension of the incoupler 212 of the waveguide 205. In some embodiments, the second scan mirror 208 causes the exit pupil of the laser light 218 to be swept along a line along the second dimension. In some embodiments, the incoupler 212 is positioned at or near the swept line downstream from the second scan mirror 208 such that the second scan mirror 208 scans the laser light 218 as a line or row over the incoupler 212.

In some embodiments, the optical engine 202 includes an edge-emitting laser (EEL) that emits a laser light 218 having a substantially elliptical, non-circular cross-section, and the optical relay 210 magnifies or minimizes the laser light 218 along its semi-major or semi-minor axis to circularize the laser light 218 prior to convergence of the laser light 218 on the second scan mirror 208. In some such embodiments, a surface of a mirror plate of the scan mirror 206 is elliptical and non-circular (e.g., similar in shape and size to the cross-sectional area of the laser light 218). In other such embodiments, the surface of the mirror plate of the scan mirror 206 is circular.

The waveguide 205 of the laser projection system 200 includes the incoupler 212 and the outcoupler 214. The term "waveguide," as used herein, will be understood to mean a combiner using one or more of total internal reflection (TIR), specialized filters, and/or reflective surfaces, to transfer light from an incoupler (such as the incoupler 212) to an outcoupler (such as the outcoupler 214). In some display applications, the light is a collimated image, and the waveguide transfers and replicates the collimated image to the eye. In general, an incoupler and outcoupler each include, for example, one or more optical grating structures, including, but not limited to, diffraction gratings, holograms, holographic optical elements (e.g., optical elements using one or more holograms), volume diffraction gratings, volume holograms, surface relief diffraction gratings, and/or surface relief holograms. In some embodiments, a given incoupler or outcoupler is configured as a transmissive grating (e.g., a transmissive diffraction grating or a transmissive holographic grating) that causes the incoupler or outcoupler to transmit light and to apply designed optical function(s) to the light during the transmission. In some embodiments, a given incoupler or outcoupler is a reflective grating (e.g., a reflective diffraction grating or a reflective holographic grating) that causes the incoupler or outcoupler to reflect light and to apply designed optical function(s) to the light during the reflection. In the present example, the laser light 218 received at the incoupler 212 is relayed to the outcoupler 214 via the waveguide 205 using TIR. The laser light 218 is then output to the eye 216 of a user via the outcoupler 214. As described above, in some embodiments the waveguide 205 is implemented as part of an eyeglass lens, such as the lens 108 or lens 110 (FIG. 1) of the display system having an eyeglass form factor and employing the laser projection system 200.

Although not shown in the example of FIG. 2, in some embodiments additional optical components are included in any of the optical paths between the optical engine 202 and the scan mirror 206, between the scan mirror 206 and the optical relay 210, between the optical relay 210 and the scan mirror 208, between the scan mirror 208 and the incoupler 212, between the incoupler 212 and the outcoupler 214, and/or between the outcoupler 214 and the eye 216 (e.g., in order to shape the laser light for viewing by the eye 216 of the user). In some embodiments, a prism is used to steer light from the scan mirror 208 into the incoupler 212 so that light is coupled into incoupler 212 at the appropriate angle to encourage propagation of the light in waveguide 205 by TIR. Also, in some embodiments, an exit pupil expander (e.g., an exit pupil expander 304 of FIG. 3, described below), such as a fold grating, is arranged in an intermediate stage between incoupler 212 and outcoupler 214 to receive light that is coupled into waveguide 205 by the incoupler 212, expand the light, and redirect the light towards the outcoupler 214, where the outcoupler 214 then couples the laser light out of waveguide 205 (e.g., toward the eye 216 of the user).

Figure 3:
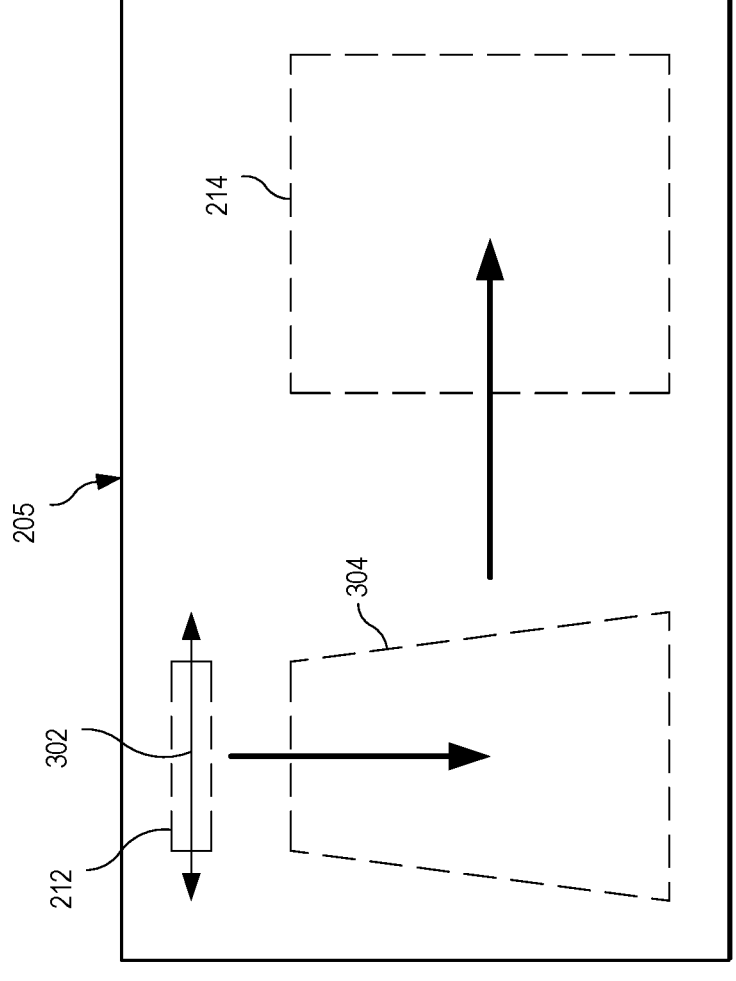
FIG. 3 is a diagram illustrating a waveguide having an incoupler, outcoupler, and exit pupil expander, in accordance with some embodiments.

FIG. 3 shows an example of light propagation within the waveguide 205 of the laser projection system 200 of FIG. 2 in accordance with some embodiments. As shown, light received via the incoupler 212, which is scanned along the axis 302, is directed into an exit pupil expander (EPE) 304 and is then routed to the outcoupler 214 to be output (e.g., toward the eye of the user). In some embodiments, the exit pupil expander 304 expands one or more dimensions of the eyebox of a WHUD that includes the laser projection system 200 (e.g., with respect to what the dimensions of the eyebox of the WHUD would be without the exit pupil expander 304). In some embodiments, the incoupler 212, the exit pupil expander 304, and the outcoupler 214 each include respective one-dimensional diffraction gratings (i.e., diffraction gratings that extend along one dimension). It should be understood that FIG. 3 shows a substantially ideal case in which the incoupler 212 directs light straight down (with respect to the presently illustrated view) in a first direction that is perpendicular to the scanning axis 302, and the exit pupil expander 304 directs light to the right (with respect to the presently illustrated view) in a second direction that is perpendicular to the first direction. While not shown in the present example, it should be understood that, in some embodiments, the first direction in which the incoupler 212 directs light is slightly or substantially diagonal, rather than exactly perpendicular, with respect to the scanning axis 302.

In embodiments, only a portion of the light received at the EPE 304 is directed by the EPE 304 to the outcoupler 214, only a portion of the light received at the outcoupler 214 is output to the user, or both. For example, as the EPE 304, outcoupler 214, or both direct received light, a portion of the received light (e.g., remaining light, light interacting with outside sources) remains within the EPE 304 or outcoupler 214 due to diffraction of the light as it reflects off the gratings of the EPE 304 or outcoupler 214, the efficiency of the EPE 304 or outcoupler 214, interactions with outside light, or any combination thereof. That is to say, when the EPE 304 or outcoupler 214 direct light from one point to another, remaining light (e.g., a portion of received light, light interacting with outside sources) remains in the EPE 304 or outcoupler 214 based on the efficiency of the EPE 304 or outcoupler 214, respectively. The efficiency of the EPE 304, outcoupler 214, or both represents a relationship between the amount of received light guided to a second point and the amount of remaining light in the EPE 304 or outcoupler 214, respectively. In embodiments, the amount of remaining light in the EPE 304 or outcoupler 214 as the EPE 304 or outcoupler 214 direct received light is based on the efficiency of the EPE 304 or outcoupler 214, respectively. For example, as the efficiency of the EPE 304 increases, the amount of remaining light in the EPE 304 as the EPE 304 directs received light decreases. Similarly, for example, as the efficiency of the outcoupler 214 increases, the amount of remaining light in the outcoupler 214 as the outcoupler 214 directs received light decreases. In embodiments, the remaining light in the EPE 304, outcoupler 214, or both causes one or more see-through artifacts to appear in the EPE 304 or outcoupler 214. Such see-through artifacts include, for example, portions of the EPE 304 or outcoupler 214 that are at least partially illuminated by the remaining light and are visible to the user, those around the user, or both. These see-through artifacts negatively impact user experience by obstructing a user's view, distracting users, distracting onlookers, or any combination thereof.

Figure 4:
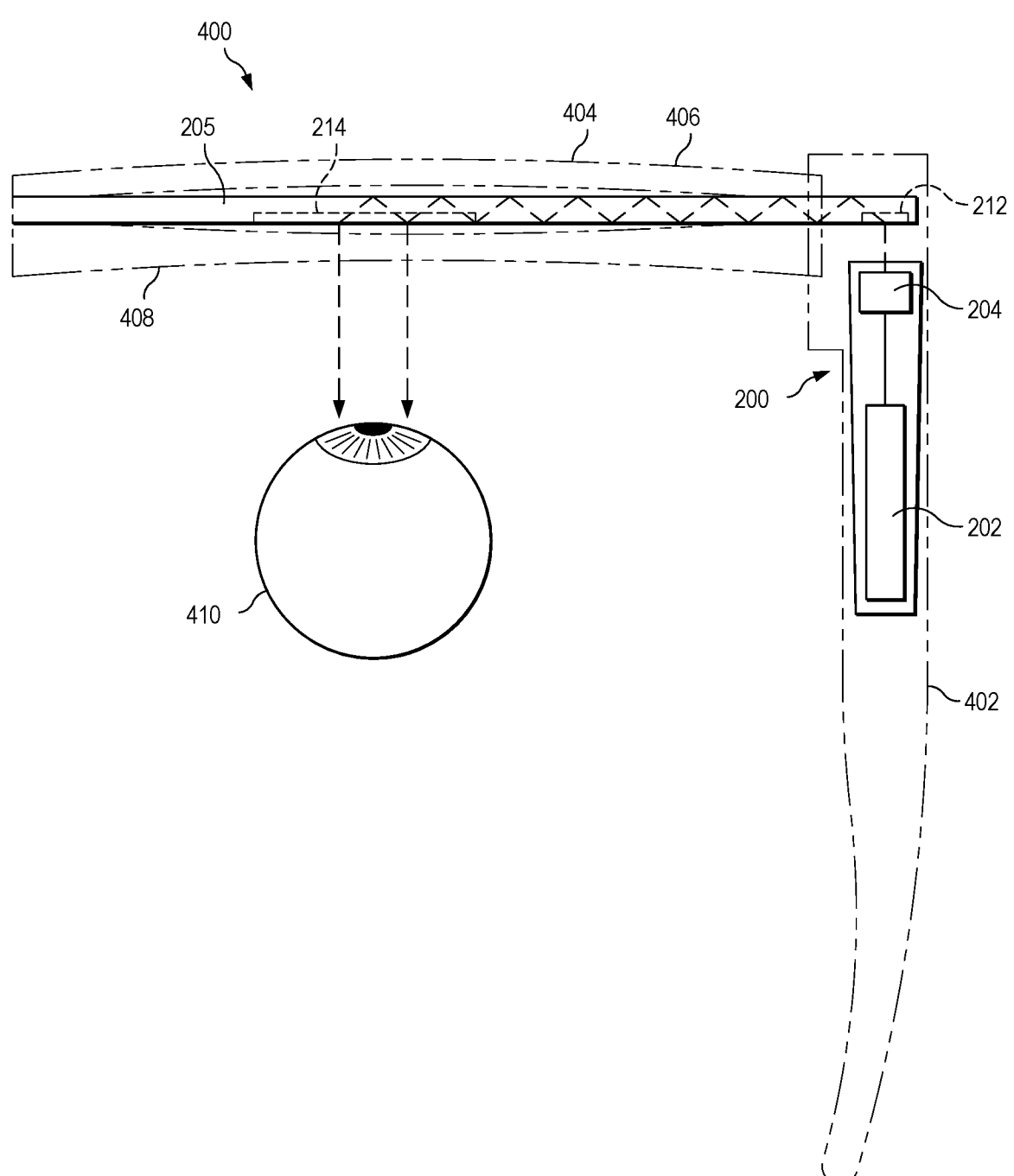
FIG. 4 is a diagram illustrating a partially transparent view of a wearable heads-up display (WHUD) that includes a laser projection system, in accordance with some embodiments.

FIG. 4 illustrates a portion of a WHUD 400 that includes the laser projection system 200 of FIG. 2. In some embodiments, the WHUD 400 represents the display system 100 of FIG. 1. The optical engine 202, the optical scanner 204, the incoupler 212, and a portion of the waveguide 205 are included in an arm 402 of the WHUD 400, in the present example.

The WHUD 400 includes an optical combiner lens 404, which includes a first lens 406, a second lens 408, and the waveguide 205, with the waveguide 205 disposed between the first lens 406 and the second lens 408. Light exiting through the outcoupler 214 travels through the second lens 408 (which corresponds to, for example, the lens element 110 of the display system 100). In use, the light exiting second lens 408 enters the pupil of an eye 410 of a user wearing the WHUD 400, causing the user to perceive a displayed image carried by the laser light output by the optical engine 202. According to embodiments, the outcoupler 214 includes one or more see-through artifacts as the outcoupler 214 directs received light to the second lens 408. For example, based on the efficiency of the outcoupler 214, one or more see-through artifacts manifest in the outcoupler 214 as the outcoupler 214 is directing light to the second lens 408. Such see-through artifacts include, for example, portions of the outcoupler 214 that are at least partially illuminated by the remaining light in the outcoupler 214. That is to say, portions of the outcoupler 214 at least partially illuminated by portions of received light that remain in the outcoupler 214 as the outcoupler 214 provides light to the second lens 408. According to embodiments, the amount of remaining light in the outcoupler 214 while the outcoupler 214 is directing received light to the second lens 208 is based on the efficiency of the outcoupler 214. As an example, as the efficiency of the outcoupler 214 decreases, the amount of remaining light in the outcoupler 214 while the outcoupler 214 is directing received light to the second lens 208 increases.

According to embodiments, the optical combiner lens 404 is substantially transparent, such that light from real-world scenes corresponding to the environment around the WHUD 400 passes through the first lens 406, the second lens 408, and the waveguide 205 to the eye 410 of the user. In this way, images or other graphical content output by the laser projection system 200 are combined (e.g., overlayed) with real-world images of the user's environment when projected onto the eye 410 of the user to provide an AR experience to the user.

Although not shown in the depicted example, in some embodiments additional optical elements are included in any of the optical paths between the optical engine 202 and the incoupler 212, in between the incoupler 212 and the outcoupler 214, and/or in between the outcoupler 214 and the eye 410 of the user (e.g., in order to shape the laser light for viewing by the eye 410 of the user). As an example, a prism is used to steer light from the optical scanner 204 into the incoupler 212 so that light is coupled into incoupler 212 at the appropriate angle to encourage propagation of the light in waveguide 205 by TIR. Also, in some embodiments, an exit pupil expander (e.g., the exit pupil expander 304), such as a fold grating, is arranged in an intermediate stage between incoupler 212 and outcoupler 214 to receive light that is coupled into waveguide 205 by the incoupler 212, expand the light, and redirect the light towards the outcoupler 214, where the outcoupler 214 then couples the laser light out of waveguide 205 (e.g., toward the eye 410 of the user). In embodiments, the exit pupil expander (EPE) includes one or more see-through artifacts as the EPE directs received light. For example, based on the efficiency of the EPE, one or more see-through artifacts manifest in the EPE as the EPE is directing light to the outcoupler 214. Such see-through artifacts include, for example, portions of the EPE that are at least partially illuminated by the remaining light in the EPE. According to embodiments, the amount of remaining light in the EPE while the EPE is directing received light (e.g., to the outcoupler 214) is based on the efficiency of the EPE. As an example, as the efficiency of the EPE increases, the amount of remaining light in the EPE while the EPE is directing received light increases.

According to embodiments, the efficiency of an EPE (e.g., EPE 304), outcoupler (e.g., outcoupler 214), or both is based on the geometries of the EPE or outcoupler, mirror coatings of the EPE or outcoupler, or both. For example, the efficiency of an EPE, outcoupler, or both is based on the geometry and coating of one or more facets that made up the EPE or outcoupler, respectively. To help reduce the number of see-through artifacts in an EPE or coupler, the efficiency of the EPE, outcoupler, or both is increased to decrease the amount of remaining light in the EPE or outcoupler as the EPE or outcoupler directs received light.

Figure 5:
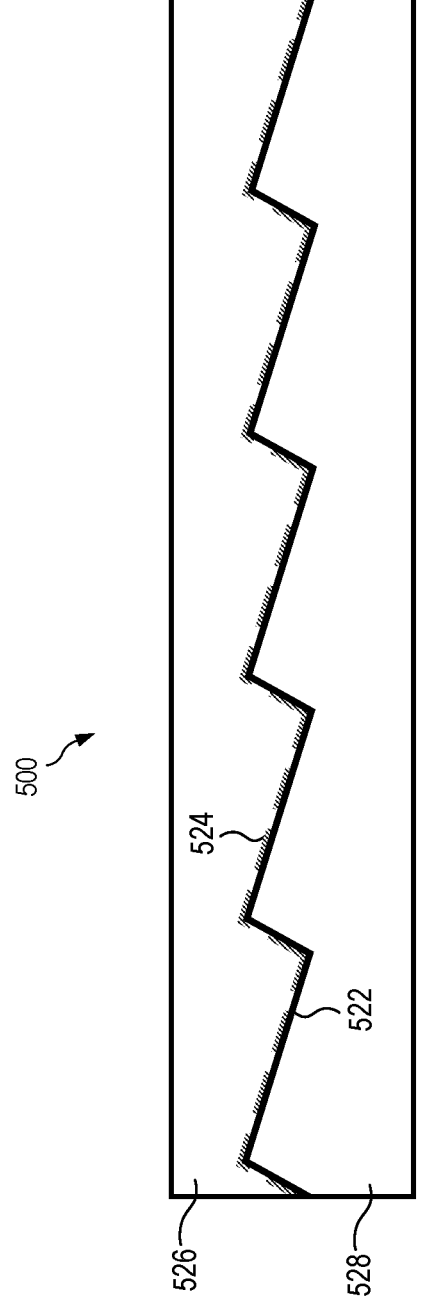
FIG. 5 is a diagram illustrating a waveguide having a plurality of Bragg gratings, in accordance with some embodiments.

To this end, FIG. 5 presents a waveguide 500 including one or more Bragg gratings. In embodiments, waveguide 500 includes at least a portion of a waveguide (e.g., waveguide 205) forming at least a portion of one or more EPEs (e.g., EPE 304), outcouplers (e.g., outcoupler 214), or both. To help increase the efficiency of an EPE, outcoupler, or both formed by waveguide 500, waveguide 500 includes one or more Bragg gratings (e.g., facets) which each include a structure of multiple layers with respective refractive indices. In some embodiments, waveguide 500 includes one or more one-dimensional (1D) Bragg gratings that are configured to only reflect light in one direction while in other embodiments, waveguide 500 includes multi-dimensional (e.g., two-dimensional) Bragg gratings that are configured to reflect light in two or more directions. Waveguide 500 includes opposing surfaces, for example, waveguide 500 includes a top surface and an opposing bottom surface. In embodiments, waveguide 500 includes a first section 526 and a second section 528 that together form waveguide 500. For example, the first section 526 is configured to fit together with the second section 528 so as to form waveguide 500. Each section 526, 528 includes opposing surfaces (e.g., top and bottom surfaces) with one surface of each section 526, 528 forming a respective surface of waveguide 500. For example, the first section 526 (e.g., the top section) includes a surface (e.g., top surface) that forms the top surface of waveguide 500 and the second section 528 (e.g., the bottom section) includes a surface (e.g., bottom surface) that forms the bottom surface of waveguide 500.

In embodiments, a surface (e.g., top surface) of the second section (e.g., bottom section) 528 includes molded optic material 522 forming at least a portion of the geometry of one or more Bragg gratings (e.g., Bragg facets). Such molded optic material 522 includes, for example, plastic optic material, acrylic plastic material, polycarbonate material, or any combination thereof. Referring to the example embodiment illustrated in FIG. 5, a top surface of second section 528 includes molded optic material 522 (e.g., plastic optic material) forming at least a portion of the geometry (e.g., one or more surfaces) of five Bragg gratings (e.g., Bragg facets). Though the example embodiment in FIG. 5 presents the molded optic material 522 forming at least a portion of the geometry (e.g., one or more surfaces) of five Bragg gratings, in other embodiments, the molded optic material of the second section 528 may form at least a portion of the geometry of any number of Bragg gratings. According to embodiments, waveguide 500 includes a layer of photopolymer 524 deposited on the molded optic material 522 of the second section 528. Such photopolymer material includes, for example, acrylics, polyvinyl alcohol, polyvinyl cinnamate, polyisoprene, polyamides, epoxies, polyimides, styrenic block copolymers, nitrile rubber, or any combination thereof, to name a few. Within the photopolymer 524 deposited on the molded optic material 522, a number of Bragg grating holograms are recorded, for example, by optical interference. For example, a Bragg grating hologram is recorded in the photopolymer 524 for each Bragg grating that has at least a portion of its geometry formed by molded optic material 522. Referring to the example embodiment illustrated in FIG. 5, the photopolymer 524 has five Bragg grating holograms recorded based on the portions of the geometry of the five Bragg gratings formed by molded optic material 522. According to embodiments, the portions of the geometry of a Bragg grating formed by molded optic material 522 together with a Bragg grating hologram recorded in the photopolymer 524 deposited on the molded optic material 522 forming the portions of the geometry of the Bragg grating form a Bragg grating.

A surface (e.g., bottom surface) of the first section 526 includes molded optic material, similar to or the same as molded optic material 522, having a geometry (e.g., shape) that is configured to couple with the molded optic material 522 of the second section 528 such that the first section 526 fits effectively flush with the second section 528 to form waveguide 500. In embodiments, the surface (e.g., bottom surface) of the first section 526 sits flush with the layer of photopolymer 524 deposited on the molded optic material 522 of the second section 528 such that the photopolymer 524 is sandwiched between the first section 526 and the second section 528 to form waveguide 500. By having the photopolymer 524 including one or more recorded Bragg grating holograms sandwiched between the first section 526 and the second section 528, a waveguide 500 including one or more Bragg gratings is formed. By including one or more Bragg gratings in the waveguide 500, the efficiency of EPEs and outcouplers formed by at least a portion of the waveguide 500 is increased. For example, because the Bragg gratings are effectively dispersion free, the Bragg gratings help reduce the amount of remaining light in any EPEs and outcouplers (e.g., a portion of received light remaining in an EPE or outcoupler as the received light is guided to a second point by the EPE or outcoupler, a portion of received light interacting with outside sources, or both) at least partially formed by waveguide 500 which also helps reduce the number of see-through artifacts present in the EPEs and outcouplers. As such, user experience is improved as there are less see-through artifacts to obstruct a user's view, distract users, distract onlookers, or any combination thereof.

Figure 6:
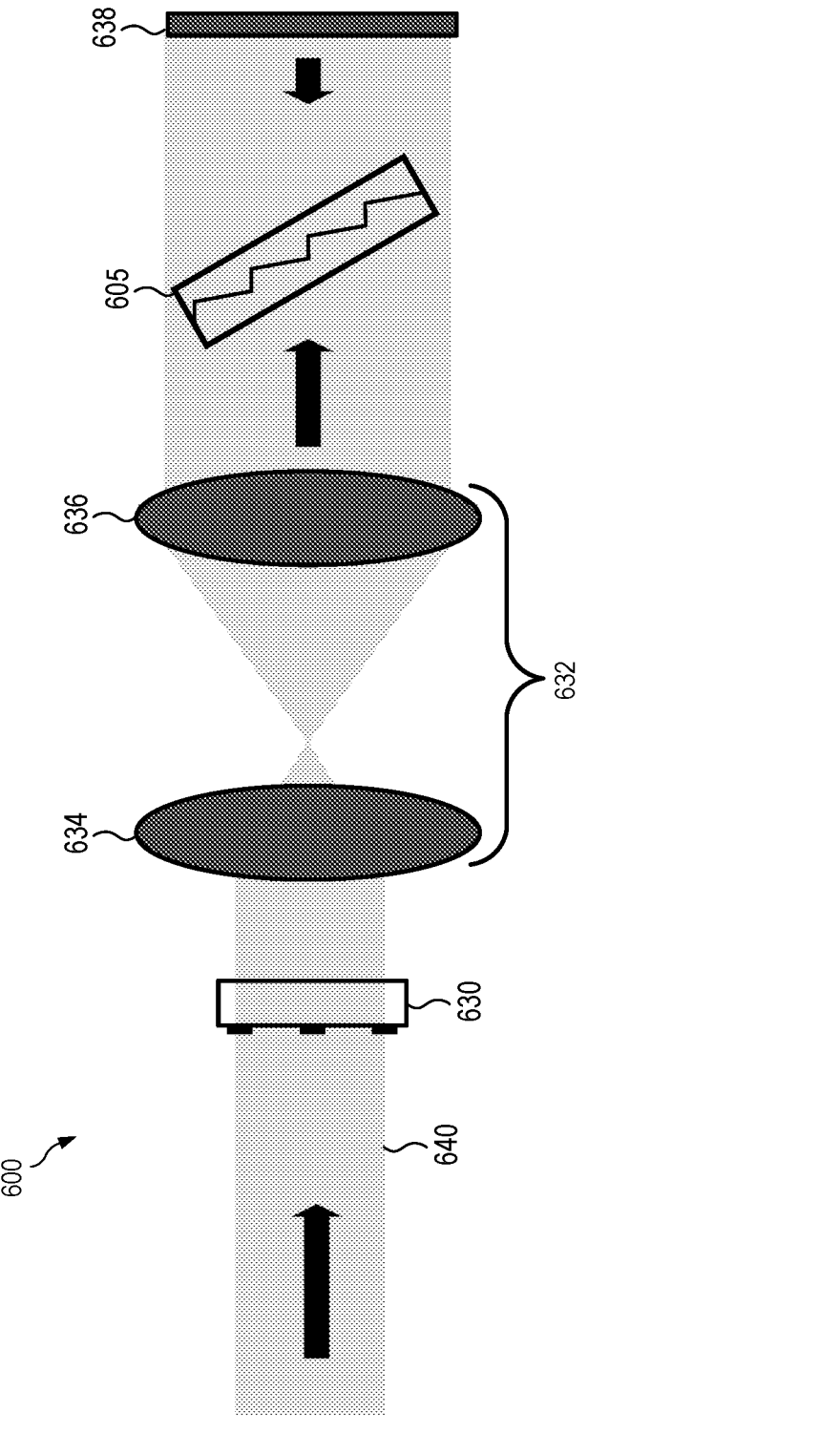
FIG. 6 is a diagram illustrating an example recording process for creating Bragg gratings, in accordance with some embodiments.

Referring to FIG. 6, an example recording process 600 for creating a plurality of Bragg gratings is presented. The example recording process 600 first includes an amplitude mask 630 configured to receive a beam of light (e.g., incident beam) 640. The amplitude mask 630 includes a material having a pattern such as, for example, chrome-plated silica, a mirror (e.g., dielectric mirror, laser mirror), metal foil, microlens array, or any combination nation thereof. The beam of light 640 includes, for example, laser light having one or more wavelengths. In embodiments, the recording process 600 includes the amplitude mask 630 receiving the beam of light 640 and providing a portion of the beam of light 640 to a relay 632 based on the pattern of the amplitude mask 630. That is to say, the portion of the beam of light 640 provided to the relay 632 is based on the pattern of the amplitude mask (e.g., light not blocked by the pattern of the amplitude mask 630). The relay 632 includes two or more lenses 634, 636 and is configured to relay the received portion of the beam of light 640 to a waveguide 605, similar to or the same as waveguide 500, that includes a layer of photopolymer sandwiched between two sections of the waveguide 605. As an example, the relay 632 includes a 4F relay that includes a first lens 634 and a second lens 636 together configured to relay the received portion of the beam of light 640 to waveguide 605. As waveguide 605 receives the relayed light from relay 632, at least a portion of the photopolymer in waveguide 605 polymerizes, forming at least a portion of one or more Bragg gratings (e.g., 1D Bragg gratings). In embodiments, at least a portion of the light relayed to waveguide 605 is configured to pass through waveguide 605 and be received by mirror 638. The portion of the light then reflects off mirror 638 back to waveguide 605. As waveguide 605 receives the reflected light from mirror 638, at least an additional portion of the photopolymer in waveguide 605 polymerizes, forming at least an additional portion of one or more Bragg gratings (e.g., 1D Bragg gratings). According to embodiments, waveguide 605 is disposed at an angle (e.g., is tilted) such that the reflective mirror facets (e.g., molded optic material 522) of the waveguide 605 are normal to the waveguide. In this way, a waveguide 605 having one or more recorded Bragg grating holograms is produced.

Figure 7:
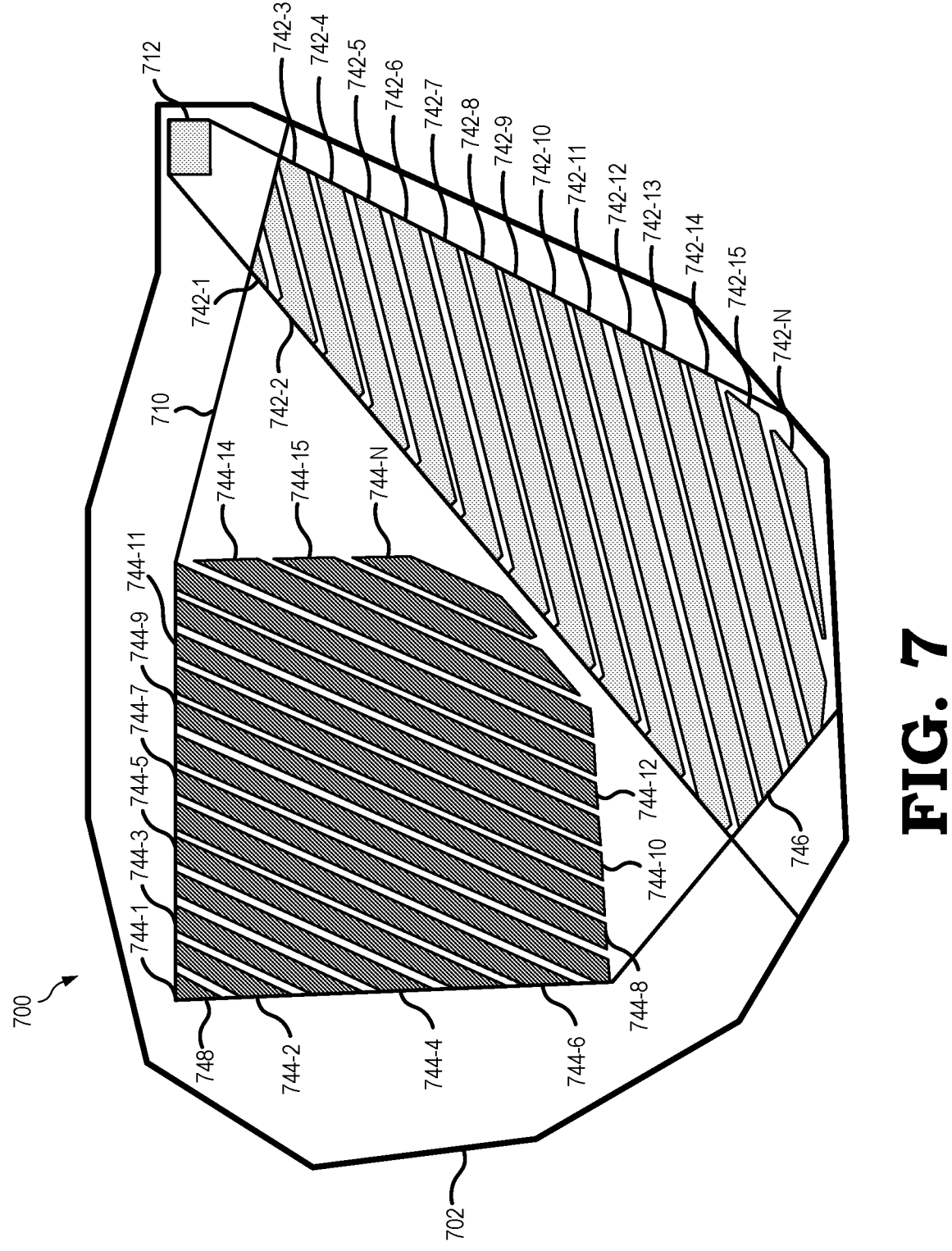
FIG. 7 is a diagram illustrating a partially transparent view of a WHUB that includes a waveguide with a multiplexed outcoupler and a multiplexed exit pupil expander, in accordance with some embodiments.

To further increase the efficiency of an EPE or outcoupler that includes one or more Bragg gratings, the EPE, outcoupler, or both are spectrally and angularly multiplexed. For example, a multiplexed EPE includes a plurality of EPEs with each EPE of the plurality of EPEs including a plurality of Bragg gratings (e.g., 1D Bragg gratings) configured only to reflect light having a respective predetermined angle, respective predetermined wavelength, or both. Similarly, a multiplexed outcoupler includes a plurality of outcouplers with each outcoupler of the plurality of outcouplers including a plurality of Bragg gratings (e.g., 1D Bragg Gratings) configured only to reflect light having a respective predetermined angle, respective predetermined wavelength, or both. To this end, FIG. 7 presents a portion of a WHUD 700 including a support structure 702, similar to or the same as support structure 102, configured to contain an optical combiner lens 710, similar to or the same as optical combiner lens 404, and an incoupler 712, similar to or the same as incoupler 212. In embodiments, optical combiner lens 710 includes two lenses (e.g., first lens 406, second lens 408) with multiplexed EPE 746 and multiplexed outcoupler 748 disposed between the lenses of the optical combiner lens 710. According to embodiments, the incoupler 712 is configured to receive light from, for example, optical engine 202, optical scanner 204, or both. In response to receiving the light, incoupler 712 is configured to provide at least a portion of the light to multiplexed EPE 746. Multiplexed EPE 746, similar to or the same as EPE 304, is configured to provide light to multiplexed outcoupler 748 and includes a plurality of EPEs 742 that are spatially multiplexed, angularly multiplexed, or both. That is to say, a plurality of EPEs 742 where each EPE 742 of the plurality of EPEs includes one or more Bragg gratings (e.g., 1D Bragg gratings) that are configured to only reflect light having one or more respective predetermined angles, one or more respective predetermined wavelengths, or both such that a respective EPE 742 of the multiplexed EPE 746 only provides light having one or more respective predetermined angles, one or more respective predetermined wavelengths, or both to multiplexed outcoupler 748. As an example, the embodiment illustrated in FIG. 7 includes a multiplexed EPE 746 having 16 EPEs 742-1, 742-2, 742-3, 742-4, 742-5, 742-5, 742-6, 742-7, 742-8, 742-9, 742-10, 742-11, 742-12, 742-13, 742-14, 742-15, 742-N each including a plurality of Bragg gratings configured to only reflect light having one or more respective predetermined angles and one or more respective predetermined wavelengths such that only light with the respective predetermined angles and respective predetermined wavelengths is provided to multiplexed outcoupler 748. Though the example embodiment in FIG. 7 presents a multiplexed EPE 746 having 16 EPEs 742 (742-1, 742-2, 742-3, 742-4, 742-5, 742-5, 742-6, 742-7, 742-8, 742-9, 742-10, 742-11, 742-12, 742-13, 742-14, 742-15, 742-N) representing an N number of EPEs 742, in other embodiments, the multiplexed EPE 746 may include any number of EPEs 742.

The multiplexed outcoupler 748, similar to or the same as outcoupler 214, is configured to provide light to a lens (e.g., second lens 408) of the optical combiner lens 710 which provides an image to the eye of a user. The multiplexed outcoupler 748 includes a plurality of outcouplers 744 that are spatially multiplexed, angularly multiplexed, or both. In other words, a plurality of outcouplers 744 each having one or more Bragg gratings (e.g., 1D Bragg gratings) configured to only reflect light having one or more respective predetermined angles, one or more respective predetermined wavelengths, or both such that a respective outcoupler 744 only provides light having one or more respective predetermined angles, one or more respective predetermined wavelengths, or both to the lens (e.g., second lens 408) of the optical combiner lens 710. As an example, the embodiment illustrated in FIG. 7 includes a multiplexed outcoupler 748 having 16 outcouplers 744-1, 744-2, 744-3, 744-4, 744-5, 744-5, 744-6, 744-7, 744-8, 744-9, 744-10, 744-11, 744-12, 744-13, 744-14, 744-15, 744-N each including a respective plurality of Bragg gratings (e.g., 1D Bragg gratings) configured to only reflect light having one or more respective predetermined angles and one or more respective predetermined wavelengths such that only light with the respective predetermined angles and respective predetermined wavelengths is provided to a lens of optical combiner lens 710. Though the example embodiment in FIG. 7 presents a multiplexed outcoupler 748 having 16 outcouplers (744-1, 744-2, 744-3, 744-4, 744-5, 744-5, 744-6, 744-7, 744-8, 744-9, 744-10, 744-11, 744-12, 744-13, 744-14, 744-15, 744-N) representing an N number of outcouplers 744, in other embodiments, the multiplexed outcoupler 748 may include any number of outcouplers 744.

In embodiments, the plurality of EPEs 742 of multiplexed EPE 746, the plurality of outcouplers 744 of multiplexed outcoupler 748, or both form a comb pattern, for example, an array of discrete diffraction peaks. Such an array of discrete diffraction peaks includes, for example, each EPE of the plurality of EPEs 742, each outcoupler of the plurality of outcouplers 744, or both being disposed such that each EPE or each outcoupler is offset from each other EPE or outcoupler by a respective predetermined distance. In this way, each EPE of the plurality of EPEs 742, each outcoupler of the plurality of outcouplers 744, or both do not interact with the same angular or spectral slice of received light and the plurality of EPEs 742, plurality of outcouplers 744, or both form a multiplexed EPE 746, multiplexed outcoupler 748, or both, respectively.

Figure 8:
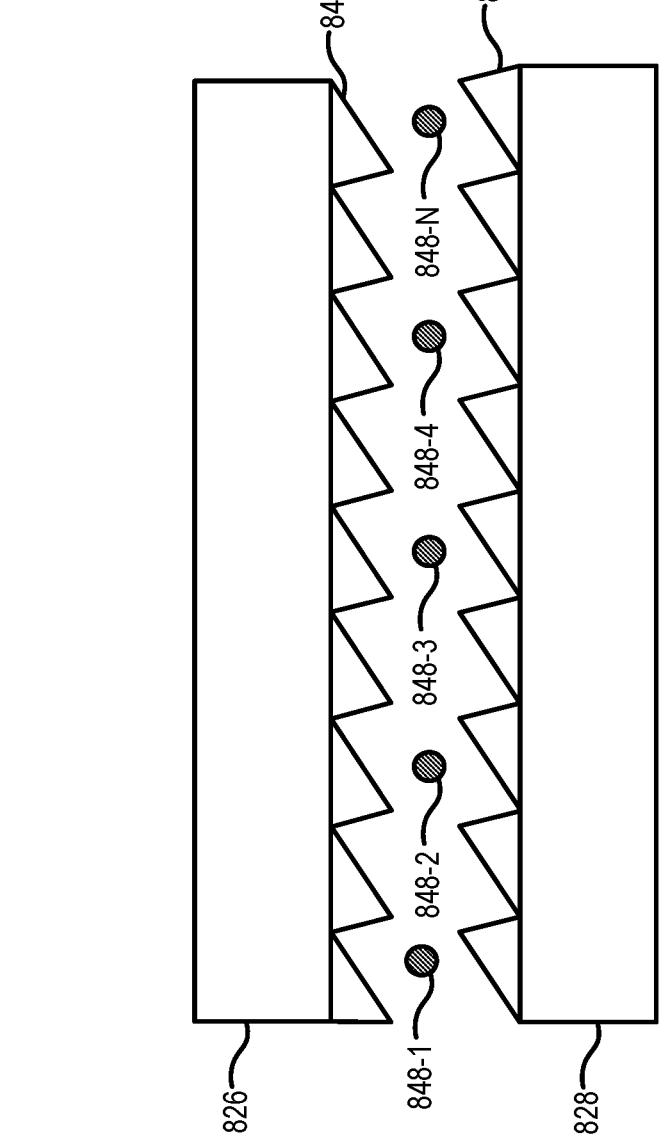
FIGS. 8 to 10 each include a diagram illustrating an example process for assembling a waveguide that includes a plurality of Bragg gratings, in accordance with some embodiments.
Figure 9:
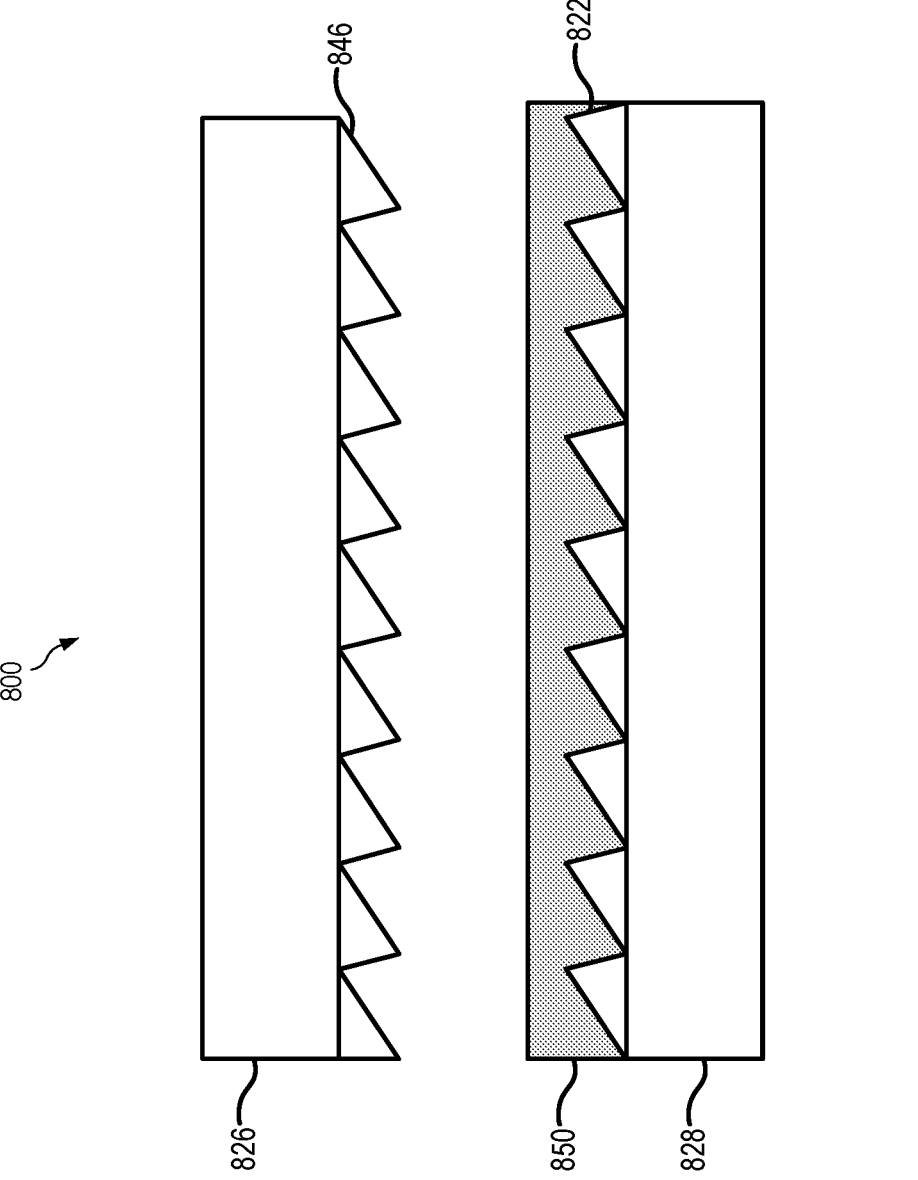
Figure 10:
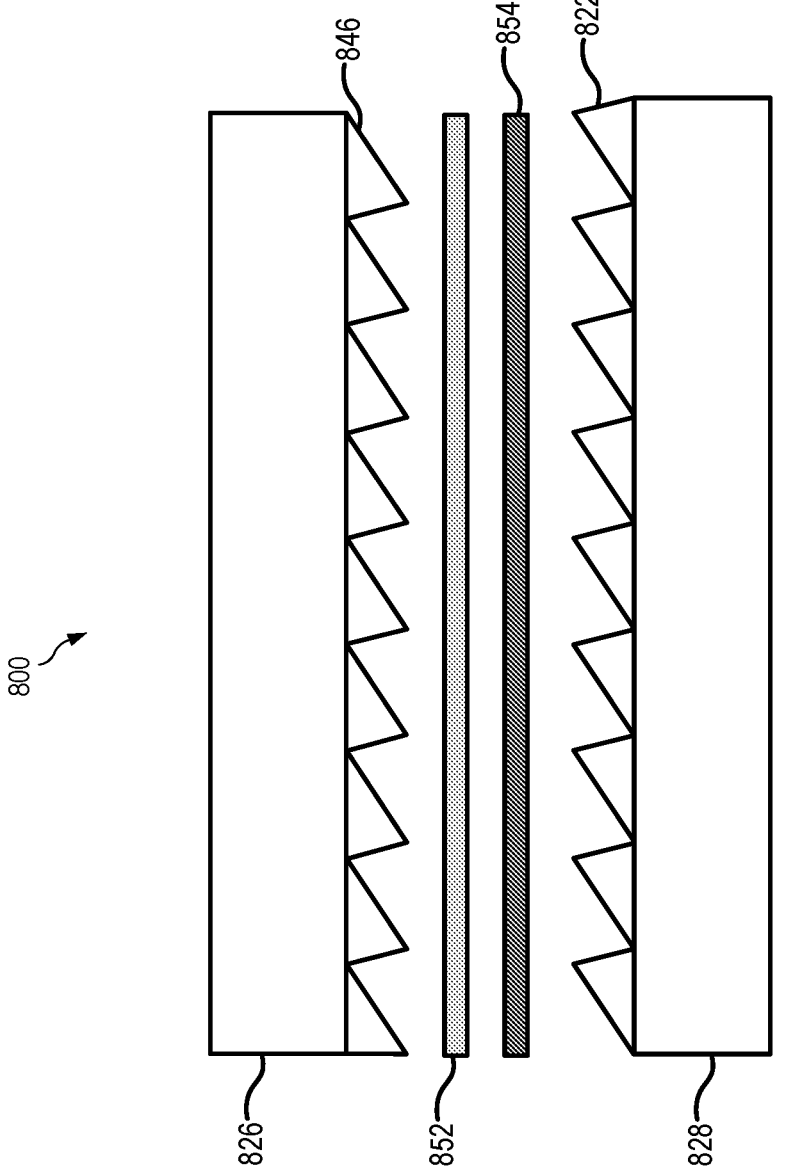

FIGS. 8-10 each present a respective process 800 for assembling a waveguide that includes a plurality of Bragg gratings. Each process presented for assembling a waveguide, similar to or the same as waveguide 205, 500, 605) includes a first section 826 (similar to or the same as first section 526) of the waveguide disposed over a section 828 (similar to or the same as second section 528) of the waveguide such that one or more edges of the sections 826, 828 are aligned. In embodiments, second section 828 includes opposing surfaces (e.g., top and bottom surfaces) with a molded optic material 822, similar to or the same as molded optic material 522, disposed on a first surface (e.g., top surface) of the second section 528. The molded optic material 822 forms at least a portion of the geometry of one or more 1D Bragg gratings and includes, for example, plastic optic material, acrylic plastic material, polycarbonate material, or any combination thereof. As an example, in the embodiment illustrated in FIG. 8, the molded optic material 822 forms at least a portion of the geometry of five 1D Bragg facets. Additionally, the first section 826 includes opposing surfaces (e.g., top and bottom surfaces) with a molded optic material 846 disposed on a surface (e.g., bottom surface) of the first section 826. The molded optic material 846 together with the molded optic material 822 forms the geometry of one or more Bragg gratings and also includes, for example, plastic optic material, acrylic plastic material, polycarbonate material, or any combination thereof. In embodiments, molded optic material 822 and molded optic material 846 are configured to couple such that the first section 826 and the second section 828 form the waveguide. For example, molded optic material 822 and molded optic material 846 are configured to sit flush with one another such that the first section 826 and the second section 828 form the waveguide. According to embodiments, each waveguide formed by sections 826, 828 includes a layer of photopolymer disposed between molded optic materials 822, 846.

To this end, FIG. 8 presents one or more spacers 848 disposed between molded optic material 822 and molded optic material 846 such that a cavity or gap is formed in the waveguide when the first and second sections 826, 828 are coupled together. Such spacers 848 include, for example, spacer beads, sparse pillars, or both disposed directly on molded optic material 822. After the cavity or gap is formed in the waveguide formed by sections 826, 828, a photopolymer resin is injected in the cavity or gap using, for example, capillary filling, vacuum drawing, or both. In this way, a layer of photopolymer material having a geometry defined by molded optic materials 822, 846 is included in the waveguide, allowing the waveguide to have one or more Bragg grating (e.g., 1D Bragg) holograms recorded in the layer of photopolymer. Though the example embodiment illustrated in FIG. 8 presents five spacers (848-1, 848-2, 848-3, 848-4, 848-N) representing an N number of spacers being used, in other embodiments, any number of spacers 848 may be used.

Alternatively, FIG. 9 presents a layer of photopolymer resin 850 deposited on molded optic material 822 using, for example, spraying, inkjet printing, or both. After the layer of photopolymer resin 850 is deposited on molded optic material 822, the first section 826 and the second section 828 are then compressed together. As the sections 826, 828 are compressed together, the layer of photopolymer resin 850 is shaped by the geometries of molded optic materials 822, 846 with any excess photopolymer resin being pushed outside of the formed waveguide. In this way, a layer of photopolymer material having a geometry defined by molded optic materials 822, 846 is included in the waveguide, allowing the waveguide to have one or more Bragg grating (e.g., 1D Bragg) holograms recorded in the layer of photopolymer. In embodiments, the layer of photopolymer resin 850 helps adhere the first section 826 to the second section 828, for example, after the layer of photopolymer resin is cured.

Further, FIG. 10 presents a layer of photopolymer material 852 deposited on a flexible substrate 854 deposed between molded optic material 846 and molded optic material 822. In embodiments, the layer of photopolymer material 852 on the flexible substrate 854 is laminated on molded optic material 822 and the first section 826 and the second section 828 are then compressed together. As the sections 826, 828 are compressed together, the photopolymer material 852 on the flexible substrate 854 is crimped into a shape based on the geometries of molded optic material 822 and molded optic material 846. In this way, a layer of photopolymer material having a geometry defined by molded optic materials 822, 846 is included in the waveguide, allowing the waveguide to have one or more Bragg grating (e.g., 1D Bragg) holograms recorded in the layer of photopolymer. According to embodiments, photopolymer material 852 is modified before the first section 826 and the second section 828 are compressed together. For example, sections of photopolymer material 852 are etched, bleached, cut, removed, or any combination thereof. IN embodiments, photopolymer material 852 is modified such that sections of photopolymer material 852 are removed to form a spatial pattern of photopolymer material 852 on flexible substrate 854.

In some embodiments, certain aspects of the techniques described above may be implemented by one or more processors of a processing system executing software. The software comprises one or more sets of executable instructions stored or otherwise tangibly embodied on a non-transitory computer-readable storage medium. The software can include the instructions and certain data that, when executed by the one or more processors, manipulate the one or more processors to perform one or more aspects of the techniques described above. The non-transitory computer-readable storage medium can include, for example, a magnetic or optical disk storage device, solid-state storage devices such as Flash memory, a cache, random access memory (RAM), or other non-volatile memory device or devices, and the like. The executable instructions stored on the non-transitory computer-readable storage medium may be in source code, assembly language code, object code, or other instruction format that is interpreted or otherwise executable by one or more processors.

A computer-readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectro-mechanical systems (MEMS)-based storage media. The computer-readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still, further, the order in which activities are listed is not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A system comprising:
an optical combiner including a waveguide that comprises:
an incoupler;
an exit pupil expander configured to receive light from the incoupler and including one or more Bragg gratings comprising a photopolymer material disposed over one or more reflective facets; and
an outcoupler configured to receive light from the exit pupil expander and including one or more Bragg gratings, the outcoupler further configured to provide light to a lens of the optical combiner.

2. The system of claim 1, wherein the lens of the optical combiner is disposed in an eyeglass lens.

3. The system of claim 1, wherein the exit pupil expander and the outcoupler are disposed between two lenses of the optical combiner.

4. The system of claim 1, wherein the exit pupil expander comprises a multiplexed exit pupil expander including a plurality of exit pupil expanders.

5. The system of claim 4, wherein each exit pupil expander of the plurality of exit pupil expanders is configured to only provide light having one or more respective predetermined angles and one or more respective predetermined wavelengths to the outcoupler.

6. The system of claim 1, wherein the outcoupler comprises a multiplexed outcoupler including a plurality of outcouplers.

7. The system of claim 6, wherein each outcoupler of the plurality of outcouplers is configured to only provide light having one or more respective predetermined angles and one or more respective predetermined wavelengths to the lens of the optical combiner.

8. The system of claim 1, wherein the one or more Bragg gratings of the outcoupler comprises a Bragg grating hologram recorded in the photopolymer material.

9. The system of claim 8, wherein the waveguide includes a first section including the one or more reflective facets and a second section coupled together with the first section to form the waveguide and wherein a layer of the photopolymer material is disposed between the first section and the second section.

10. The system of claim 1, wherein the one or more Bragg gratings of the exit pupil expander include 1-dimensional Bragg gratings.

11. A wearable heads-up display (WHUD), comprising:
a support structure configured to carry an optical combiner including a waveguide that comprises:
an incoupler;
an exit pupil expander configured to receive light from the incoupler and including one or more Bragg gratings, the one or more Bragg gratings including a photopolymer material disposed over one or more reflective facets; and
an outcoupler configured to receive light from the exit pupil expander and including one or more Bragg gratings, the outcoupler further configured to provide light to a lens of the optical combiner.

12. The WHUD of claim 11, further comprising:
an eyeglass lens carried by the support structure, wherein the lens of the optical combiner is disposed in the eyeglass lens.

13. The WHUD of claim 11, wherein the exit pupil expander comprises a multiplexed exit pupil expander including a plurality of exit pupil expanders.

14. The WHUD of claim 13, wherein each exit pupil expander of the plurality of exit pupil expanders is configured to only provide light having one or more respective predetermined angles and one or more respective predetermined wavelengths to the outcoupler.

15. The WHUD of claim 11, wherein the outcoupler comprises a multiplexed outcoupler including a plurality of outcouplers.

16. The WHUD of claim 15, wherein each outcoupler of the plurality of outcouplers is configured to only provide light having one or more respective predetermined angles and one or more respective predetermined wavelengths to the lens of the optical combiner.

17. The WHUD of claim 11, wherein the one or more Bragg gratings of the exit pupil expander comprises a Bragg grating hologram recorded in the photopolymer material.

18. A system comprising:
a waveguide including:
an incoupler;
a multiplexed exit pupil expander configured to receive light from the incoupler and including a plurality of exit pupil expanders, each including one or more Bragg gratings comprising a photopolymer material disposed over one or more reflective facets; and
a multiplexed outcoupler configured to receive light from the multiplexed exit pupil expander and including a plurality of outcouplers, each including one or more Bragg gratings, the multiplexed outcoupler further configured to provide light out of the waveguide.

19. The system of claim 18, wherein:
each exit pupil expander of the plurality of exit pupil expanders is configured to only provide light having one or more respective predetermined angles and one or more respective predetermined wavelengths to the multiplexed outcoupler; and
each outcoupler of the plurality of outcouplers is configured to only provide light having one or more respective predetermined angles and one or more respective predetermined wavelengths to a lens of an optical combiner.

20. The system of claim 18, wherein the plurality of exit pupil expanders is arranged in an array of discrete diffraction peaks and wherein the plurality of outcouplers is arranged in an array of discrete diffraction peaks.

* * * * *